US008930924B2

(12) United States Patent
Fablet et al.

(10) Patent No.: US 8,930,924 B2
(45) Date of Patent: Jan. 6, 2015

(54) METHOD OF ENCODING AND DECODING A GRAPHICS PATH SEQUENCE INTO A LAYERED SCHEME

(75) Inventors: Youenn Fablet, La Dominelais (FR); Romain Bellessort, Rennes (FR); Franck Denoual, Saint Domineuc (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 12/815,567

(22) Filed: Jun. 15, 2010

(65) Prior Publication Data

US 2010/0322527 A1 Dec. 23, 2010

(30) Foreign Application Priority Data

Jun. 17, 2009 (EP) .................................... 09290457

(51) Int. Cl.
*G06F 9/45* (2006.01)
(52) U.S. Cl.
USPC .......................................................... 717/146
(58) Field of Classification Search
USPC ........ 715/222, 234, 249, 716; 358/1.13, 1.15, 358/1.18; 382/242, 232, 244; 345/420, 441, 345/473, 582, 619; 375/298, 522; 717/152, 717/146, 159; 709/231; 341/87
See application file for complete search history.

(56) References Cited

U.S. PATENT DOCUMENTS

| 6,614,428 B1* | 9/2003 | Lengyel ........................ 345/420 |
| 6,624,769 B2 | 9/2003 | Oktem et al. ................... 341/87 |
| 6,992,782 B1* | 1/2006 | Yardumian et al. .......... 358/1.13 |
| 7,747,086 B1* | 6/2010 | Hobbs et al. ................... 382/232 |
| 2003/0021485 A1* | 1/2003 | Raveendran et al. ......... 382/244 |
| 2003/0038738 A1* | 2/2003 | Oktem et al. .................... 341/87 |
| 2007/0053601 A1* | 3/2007 | Talapov et al. ............... 382/244 |
| 2007/0186005 A1* | 8/2007 | Setlur et al. ................... 709/231 |

(Continued)

FOREIGN PATENT DOCUMENTS

| CN | 1992896 A | 7/2007 |
| CN | 101099387 A | 1/2008 |

(Continued)

OTHER PUBLICATIONS

ISO/IEC FDIS, "WD3.0 of ISO/IEC 14496-20 2nd Ed." Coding of audio-visual objects, Part 20: Lightweight Scene Representation (LASeR) and Simple Aggregation Format (SAF)- Jan. 23-Apr. 2006, pp. 1-92 <http://www.mpeg-aser.org/documents/DRAFT_LASER_2nd_ED.pdf> attached as <DRAFT_LASeR_07.pdf>.*

(Continued)

*Primary Examiner* — Tuan A Vu
(74) *Attorney, Agent, or Firm* — Fitzpatrick, Cella, Harper & Scinto

(57) ABSTRACT

This invention relates to a method of encoding a path in layered form so as to allow partial decoding and progressive rendering while decoding. The path is made of an original sequence of original draw commands, each corresponding to an original portion of a drawing. The method of encoding includes transforming at least one original draw command into an approximating draw command according to a geometrical approximation of the corresponding original portion of a drawing, to obtain a reduced sequence, encoding the reduced sequence into an encoded reduced sequence, and encoding a reconstruction information set representing the difference between the reduced sequence and the original sequence.

17 Claims, 8 Drawing Sheets

(56) References Cited

U.S. PATENT DOCUMENTS

| | | | |
|---|---|---|---|
| 2007/0208792 A1* | 9/2007 | Berjon et al. | 708/207 |
| 2008/0063114 A1* | 3/2008 | Joung et al. | 375/298 |
| 2008/0098029 A1 | 4/2008 | Ruellan | 707/102 |
| 2008/0140645 A1 | 6/2008 | Denoual | 707/5 |
| 2008/0250055 A1 | 10/2008 | Ruellan et al. | 707/102 |
| 2008/0309676 A1* | 12/2008 | Nehab et al. | 345/582 |
| 2008/0320031 A1 | 12/2008 | Denoual | 707/102 |
| 2009/0138529 A1 | 5/2009 | Bellessort | 707/203 |
| 2009/0183067 A1 | 7/2009 | Fablet | 715/234 |
| 2009/0254882 A1 | 10/2009 | Ruellan | 717/120 |
| 2009/0287625 A1 | 11/2009 | Fablet et al. | 706/45 |
| 2009/0313293 A1 | 12/2009 | Setlur et al. | |
| 2009/0317011 A1* | 12/2009 | Axelsson | 382/242 |
| 2010/0001886 A1 | 1/2010 | Bellessort et al. | 341/51 |
| 2010/0010995 A1 | 1/2010 | Fablet et al. | 707/6 |
| 2010/0083101 A1 | 4/2010 | Denoual et al. | 715/242 |
| 2010/0115397 A1 | 5/2010 | Bellessort et al. | 715/234 |
| 2010/0153837 A1 | 6/2010 | Bellessort et al. | 715/234 |
| 2010/0192056 A1 | 7/2010 | Bellessort et al. | 715/237 |
| 2010/0241949 A1 | 9/2010 | Ruellan et al. | 715/234 |
| 2010/0287460 A1 | 11/2010 | Denoual et al. | 715/234 |
| 2010/0318896 A1 | 12/2010 | Ruellan et al. | 715/234 |

FOREIGN PATENT DOCUMENTS

| | | | |
|---|---|---|---|
| CN | 101300810 A | 11/2008 | |
| JP | 02-071384 | 3/1990 | G06T 11/20 |
| JP | 02-162159 | 6/1990 | B62D 5/04 |
| JP | 06-162159 | 6/1994 | G06F 17/50 |
| JP | 08-185523 | 7/1996 | G06T 9/00 |
| JP | 2005-215951 | 8/2005 | G06F 12/00 |
| WO | 2007/106211 | 9/2007 | G06F 15/16 |

OTHER PUBLICATIONS

SVG 1.1, ch. 19: Animation, <www.w3.org/TR/SVG/animate.html> Jan. 22, 2009, p. 1-35 <TRSVG_012209.pdf>.*

* cited by examiner

METHOD OF ENCODING AND DECODING A GRAPHICS PATH SEQUENCE INTO A LAYERED SCHEME

This application claims priority from European patent application No. 09290457 of Jun. 17, 2009, which is incorporated herein by reference.

FIELD OF THE INVENTION

This invention relates to a method of encoding a graphics path in layered form so as to allow partial decoding and progressive rendering while decoding.

BACKGROUND OF THE INVENTION

A graphics path generally represents a graphic, drawing or image in a graphics description language, such as SVG (standing for "Scalable Vector Graphics"), DrawML or Microsoft Silverlight (trademark). For the purposes of explanation, the following description focuses on the SVG standard.

In a known manner, the SVG standard is an XML grammar for stylable graphics, usable as an XML namespace, to describe vector graphics drawings.

Thanks to the vector-based approach, an SVG image can be rendered at any given resolution without loss of precision.

SVG uses the XML syntax to define a set of elements and attributes describing geometric shapes, transformations, colours or animations. For example, an XML element may define a draw command and comprise coordinate or parameter attributes associated with the command.

Simple geometric shapes allowed by SVG are rectangles, circles, ellipses, lines and even polygons.

More complex shapes may be drawn using a specific tool, namely the SVG path, and corresponding XML element <path d=" ... ">.

The SVG path represents the outline of a shape and is written as a sequence of draw commands and associated arguments, such as coordinates (defining points), and radius or arc flags, the sequence describing a complex geometric shape from successive drawing portions (each corresponding to a command), like lines, Bezier curves and/or arcs.

The path defining the shape outline is written in the attribute "d" of the XML element, and can be written using either absolute coordinates or relative coordinates. Relative coordinates are written on the basis of the preceding coordinates in the path.

The draw commands are defined by letters, where uppercase letters specify the use of absolute coordinates while lowercase letters correspond to relative coordinates. By using both uppercase and lowercase letters, absolute and relative coordinates can be mixed within the same path.

As an example, the two following paths represent the same complex geometric shaped, the first one containing absolute coordinates while the second is made of relative coordinates.

M14.0, 70.9 L14.0, 55.0 L 2.0, 71.0 L14.0, 70.9 Z m14.0, 70.9 l 0.0,−15.9 l−12, 16.0 l12.0, −0.1 z

"M" or "m" is a "move-to" draw command defining a new geometric point to consider.

"L" or "l" is a line command specifying the end point of the line.

"Z" is a closepath command, closing the outline of the path by a straight line between the last processed point and the first point of the path.

A "C" or "c" command defines a cubic curve. The latter requires six parameter values as shown in FIG. 1: (x1,y1) is the first control point, (x2,y2) is the second control point and (x,y) is the destination point of the curve, the initial point of the curve being the destination point (xe, ye) of the previous command.

SVG curve commands also comprise an "S/s" smooth cubic curve command, a "Q/q" or "T/t" Quadratic Bézier command or an "A/a" Elliptical arc command.

The present invention relates to the encoding of XML-based documents of SVG type.

Since XML has a verbose syntax to describe the structure of a document, specific encoding mechanisms for XML have been investigated to encode the content of an XML document in a more efficient format while maintaining the ability to easily rebuild the original XML document.

Binary XML formats have thus been developed, including the Fast Infoset format and the Efficient XML Interchange (EXI) format.

Those two formats use index tables to encode the new occurrences of repeated content or structural elements with an associated index, instead of the whole content or structural element. Bits for encoding the XML document are then saved. The majority of the saving is generally due to structural information.

While Binary XML formats can be used to encode SVG documents, most of these formats are not adapted to such encoding in a compact way.

This is because SVG documents comprise a small part of structural information compared to the content part.

This is also because large SVG contents are rarely repeated and are usually of a complex type for which the efficiency of the known Binary XML encoding dedicated to simple data type, such as integer or float, cannot be taken advantage of. Those large contents are for example graphics paths, which mix simple graphics commands with coordinates, or a list of values (both integer and float).

Several specific Binary XML encoding formats for SVG documents have therefore been developed.

In particular, from U.S. Pat. No. 6,624,769, a method is known that separately encodes the draw commands and the associated integer arguments of an SVG path sequence.

Firstly, the commands are encoded by attributing a Huffman-like code only to commands used in the graphics path, therefore reducing the number of codes (i.e. bits) used.

Secondly, the arguments, which are only integers since the SVG profile of the patent is dedicated to mobile phones, are encoded in a binary format using the minimum number of bits allowing encoding any argument contained in the graphics path. The arguments are split into two categories: arguments belonging to absolute uppercase letter commands and arguments belonging to relative lowercase commands.

For each category of arguments, the minimum number of bits allowing encoding all the arguments of this category is calculated. Then, each argument is encoded using a number of bits depending on its category.

By adjusting the number of bits to the minimum required to encode a category of arguments or the commands, this format provides an efficient compression of SVG documents.

There is also known, from US patent application publication No. 2008/0063114, a lightweight application scene representation (LASeR) binary XML format targeted to encoding SVG documents.

According to this application, the encoding of an SVG path sequence uses the better of two methods to encode arguments.

The first method plans to encode the first two arguments using a first bit-length, and to encode all remaining arguments as relative arguments using two other bit-lengths. The first bit-length is the minimum bit-length allowing encoding the first two arguments. The two other bit-lengths are computed in a similar way: the first other bit-length is the minimum bit-length allowing encoding of all relative abscissa coordinates, while the second other bit-length is the minimum bit-length allowing encoding all relative ordinate coordinates.

The second method plans to encode the first two arguments using a first bit-length, and to encode all further arguments as relative arguments using an exponential-Golomb encoding.

However, the solutions disclosed in these two publications suffer from several drawbacks.

In particular, the rendering of the encoded SVG drawing requires the decoding of all the information of the SVG path to draw and display a complete image.

For rendering an SVG image into thumbnails or small rendering sizes, the data path precision is generally too great such that the processing of the encoded SVG data wastes time.

Therefore, there is a need to provide a method for encoding a graphics document, such as an SVG document, which can be dedicated to partial decoding and/or progressive rendering, while retaining good compression performance.

Another specific Binary XML format dedicated to the SVG documents is disclosed in a presentation from Expway (www.mitre.org/news/events/xml4bin/pdf/thienot_binary.pdf, slides 53-56).

The disclosed method conducts a linear quantization of the coordinate values to encode the latter over a smaller number of bits, for example 7 to 9 bits. As shown by the exemplary figures of this presentation, the method drastically reduces the precision of the path data and the rendered drawing.

This method also suffers from several drawbacks.

The Expway method is a lossy compression that does not allow recovery of the full resolution of the original image.

It is desirable to have a graphics path encoding enabling partial decoding or progressive rendering.

SUMMARY OF THE INVENTION

To that end, an object of the invention is a method of encoding a path representing a graphic in a graphics description language, said path comprising an original sequence of original draw commands, each corresponding to an original portion of a drawing, the method comprising the following steps:

transforming at least one original draw command into an approximating draw command according to a geometrical approximation of the corresponding original portion of a drawing, to obtain a reduced sequence;

encoding said reduced sequence into an encoded reduced sequence; and encoding a reconstruction information set representing the difference (resulting from the transformation) between the reduced sequence and the original sequence.

This method makes provision for replacing the path sequence with another "reduced" sequence which geometrically approximates the original sequence.

This reduced sequence may then be used when decoding to provide a low resolution or small size rendering of the corresponding image.

Further, the complementary "reconstruction" information set enabling reconstruction of the original sequence from the reduced sequence is also encoded, so that, on decoding, a higher or full resolution rendering may also be obtained.

Thus, the method may enable lossless reconstruction or nearly lossless reconstruction.

Thanks to the method according to the invention, an image rendering may be obtained by partially decoding the original path to obtain a low resolution layer.

Further, progressive rendering may be also obtained by additionally decoding the complementary information set (a higher resolution layer) to enhance the rendering towards a higher or even a full resolution rendering.

The greater the quantity of data decoded, the better the resolution of the rendered image.

As will be discussed later, the geometrical approximations may be chosen to obtain simpler draw commands that require fewer bits or arguments to encode. The length of the resulting "reduced" path sequence is then reduced.

Thus, the method enables a processing-time reduction for providing a low resolution rendering. A faster rendering of the base layer may thus be obtained.

As stated above, the invention is suitable for any graphics description language which provides a path representing a graphic. This exemplarily concerns the SVG standard as well as the DrawML and the Microsoft Silverlight recommendations.

According to one aspect of the invention, a draw command comprises a draw command type and arguments, such as coordinates, and said approximating draw command comprises fewer arguments than said original draw command. The size of the reduced sequence may then be drastically reduced for a better compression and transmission of low resolution images. At the decoding side, a faster rendering is obtained using less memory.

Particularly, at least one argument of the approximating draw command is computed from the arguments of the original draw command. This may be the case for approximating a quadratic curve command which requires a specific control point. For example, the "approximating" argument can be the barycentre of original control point arguments of a cubic Bezier curve draw command. The use of the barycentre is well-adapted for a cubic-to-quadratic approximation and enables a compact, simple and fast computation of the original cubic parameters.

According to another aspect of the invention, an approximating draw command corresponding to the transformation of the original draw command within the reduced sequence is one of an approximating point draw command, an approximating line draw command and an approximating quadratic curve command. These approximating commands provide efficient encoding since they require few arguments, and provide fast image rendering at the decoder side since they are commands with faster rendering.

In particular, the geometrical approximation converts an SVG cubic Bezier curve command into one of said approximating point, line or quadratic curve commands. This transformation is the most efficient one since SVG cubic Bezier curve commands require about six arguments and the proposed approximating commands require respectively zero, two and four arguments.

According to another particular feature, the step of transforming comprises computing a distance between the draw corresponding to the original draw command and the draw corresponding to the approximating draw command, and comparing the calculated distance with at least one threshold value. In this context, the transformation takes directly into account the potential rendering distortions or modifications as a criterion to apply an approximating transformation. A homogeneously rendered image is then obtained with low variations of distortion within the image.

Such threshold values may be calculated based on rendering resolutions expected at the decoder. Since a number of approximations may be iteratively performed to produce a plurality of resolution layers, a plurality of threshold values may be used, each corresponding to an expected resolution.

Particularly, in the case of an original cubic curve command comprising a control vector at each of the end points of the curve, said distance comprises the norms of the orthogonal projections of the two control vectors on a perpendicular to the line made by the two end points.

The orthogonal projections are easily computed. An efficient indication is then obtained as to whether the corresponding draw is highly curved or not. The greater the norms are, the more the draw is curved. Thus, approximation is made if the norms are small enough compared to threshold values.

According to a feature of the invention, said reconstruction information set comprises:
 the original draw command types that have each been transformed into different approximating draw command types, and
 arguments of the original draw command that have not been kept in the approximating draw command and/or arguments calculated from the arguments of the original draw command and enabling the retrieval of arguments that have not been kept in the approximating draw command.

This reconstruction information set enables the reconstruction of the original data (lossless compression). By splitting the original data into a reconstruction information set and a reduced sequence, data may be encoded into different resolution layers.

According to another feature of the invention, the encoding method comprises a plurality of iterative transformations of the original sequence, including an approximating transformation according to a geometrical approximation,
 the reduced sequence resulting from the last transformation being encoded and at least one of the reconstruction information sets of the transformations being encoded.

"Iterative transformations" is understood as meaning that the resulting sequence of one transformation is the input of the next transformation. A number of encoded layers is thus obtained allowing different resolution rendering possibilities at the decoding side. Progressive rendering is then possible.

In particular, each of the reconstruction information sets is encoded. Lossless encoding is thus obtained.

However, a limited number of the reconstruction information sets may be encoded, thus providing lossy encoding. The limited number may be determined based on dynamic conditions, such as the available network bandwidth. From this provision, the most important information is first sent, before the complementary reconstruction information sets.

According to a particular feature, a transformation prior to said approximating transformation comprises rewriting the original path sequence into all absolute or all relative values. Coordinates in the path sequence are then more homogeneous for better encoding.

Alternatively or in combination, a transformation prior to said approximating transformation comprises rewriting the original path sequence by replacing a draw command by an equivalent draw command having fewer arguments. The length of the sequence is thus reduced.

A simpler path sequence to process is then obtained. Similarly to the approximating transformation, the reconstruction information set comprising the differences for enabling reconstruction of the original path sequence from the rewritten sequence may be produced (and then stored and encoded).

According to another particular feature, a transformation prior to said approximating transformation comprises a step of sub-sampling the original sequence or the rewritten sequence to obtain a sub-sampled sequence and the reconstruction information set that comprises the super-sampling information enabling the reconstruction of the original or rewritten sequence from the sub-sampled sequence. Thanks to this provision, the approximating transformation is performed on a limited number of possible data, which are then handled over a limited number of bits. Processing is thus made easier.

According to another particular feature, each transformation step comprises the storage of the reconstruction information sets in a first-in-last-out (FILO) memory. Encoding of the reconstruction sets in the opposite order to that in which they are produced is therefore simplified. Such opposite order when encoding enables quick and efficient progressive image rendering at the decoding side.

According to a specific embodiment, several approximating transformations are iterated on the reduced sequence to obtain a plurality of reconstruction information sets and a final reduced sequence, and
 the plurality of reconstruction information sets and the final reduced sequence are encoded to produce a plurality of encoded layers of different image resolutions.

According to another aspect of the invention, said reduced sequence is first encoded before any reconstruction information set. This ensures that, at the decoding side, a low resolution rendering may be quickly obtained. In particular, reconstruction information sets may be retrieved from the FILO memory mentioned above, so as to encode the sets in the opposite order to that in which they were produced.

According to another aspect of the invention, the reduced sequence comprises a sequence of values corresponding to arguments of the commands within said reduced sequence, and
 the values of the first coordinate of the reduced sequence are linearly encoded as absolute values, and the values of the other coordinates are encoded relatively to the values of the preceding coordinate within the sequence.

Since the relative values are generally smaller than absolute values, a more compact encoded representation of the reduced sequence may be obtained.

According to a particular feature, the values of the coordinates within a reconstruction information set are encoded relatively to the values of the preceding coordinate within the set and the previously encoded reduced sequence or reconstruction information set. Again, a more compact encoded representation of the reconstruction set may be obtained thanks to this provision.

The invention also relates to a method of decoding encoded data representing a graphic in a graphics description language, comprising the following steps:
 receiving and decoding a first sequence from the encoded data to obtain a graphics path sequence of approximating draw commands;
 determining if a new layer of encoded data has to be decoded;
 in case of a positive determination:
  receiving and decoding an information set corresponding to a new layer, from the encoded data;
  transforming at least one approximating draw command of the decoded graphics path sequence into an upgraded draw command based on the decoded information set, to obtain an upgraded path sequence.

Correlatively with the encoding method, the transformation is a geometrical transformation which generally provides a more complex draw.

According to one aspect of the invention, the steps of receiving and decoding an information set and of transforming are iterated on said upgraded path sequence, as long as a new layer of encoded data has to be decoded. Progressive decoding of each layer to progressively reconstruct the original path sequence is thus obtained.

According to a feature, the method further comprises post-processing said upgraded path sequence using predictions to smooth the rendered drawing corresponding to the upgraded path sequence. Such post-processing occurs when no further layer has to be decoded (i.e. for a negative determination). A more visually pleasant rendering is thus achieved.

According to an embodiment, the method comprises, in case of a negative determination:
converting at least one approximating draw command into a path draw command of said graphics description language or removing said approximating draw command, to obtain a converted sequence;
rendering an image on the basis of the converted sequence.

In particular, the removing of said approximating draw command is performed when said approximating draw command corresponds to a point command.

Correlatively, the invention concerns a device for encoding a path representing a graphic in a graphics description language, said path comprising an original sequence of original draw commands, each corresponding to an original portion of a drawing, the device comprising:
a transformation means to transform at least one original draw command into an approximating draw command according to a geometrical approximation of the corresponding original portion of a drawing, to obtain a reduced sequence;
an encoding means to encode said reduced sequence into an encoded reduced sequence, and to encode a reconstruction information set representing the difference between the reduced sequence and the original sequence.

Optionally, the device may comprise means relating to the features of the encoding method set forth above.

Correlatively, the invention concerns a device for decoding encoded data representing a graphic in a graphics description language, comprising:
a receiving means to receive a first sequence from the encoded data and a decoding means to decode said first sequence to obtain a graphics path sequence of approximating draw commands;
a determination means to determine if a new layer of encoded data has to be decoded;
means to receive and decode, in case of a positive determination, an information set corresponding to a new layer, from the encoded data;
a transformation means to transform at least one approximating draw command of the decoded graphics path sequence into an upgraded draw command based on the decoded information set, to obtain an upgraded path sequence.

Optionally, the device may comprise means relating to the features of the decoding method set forth above.

An information storage means, that is readable by a computer system, comprises instructions for a computer program adapted to implement the method of coding or decoding in accordance with the invention when that program is loaded and executed by the computer system.

A computer program readable by a microprocessor, comprises portions of software code adapted to implement the method of coding or decoding in accordance with the invention, when it is loaded and executed by the microprocessor.

The computer program and the information storage means have characteristics and advantages that are analogous to the methods they implement.

BRIEF DESCRIPTION OF THE DRAWINGS

Additional advantages and features of the present invention will become apparent from the description that follows given by way of example only, with reference to the accompanying drawings, in which.

DETAILED DESCRIPTION OF EMBODIMENTS OF THE INVENTION

Figure 2:
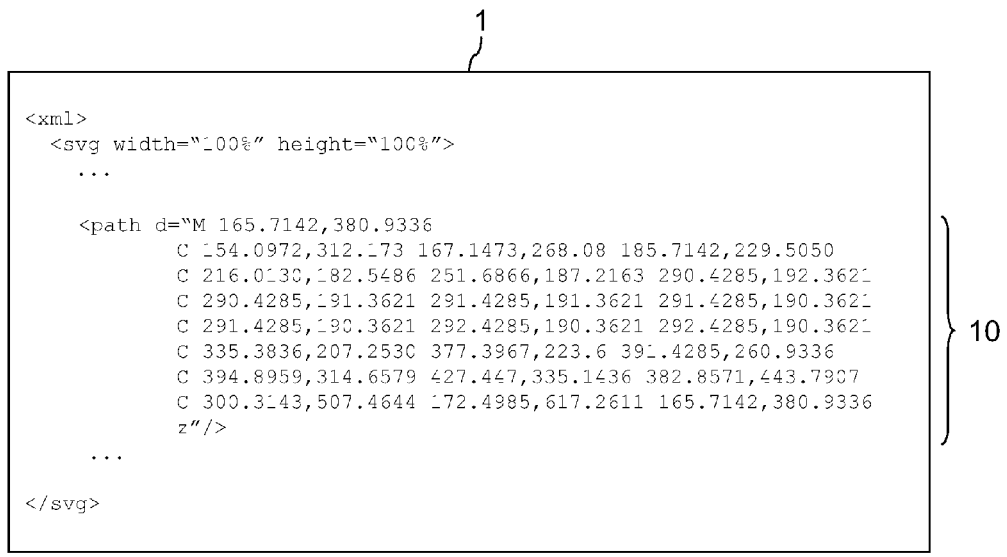
FIG. 2 represents an exemplary excerpt of an SVG document including an SVG path sequence.

An illustration of the invention is first given based on the exemplary SVG document 1 depicted in FIG. 2.

The SVG document 1 comprises an SVG element of "path" type, the attribute "d" of which defining an original path sequence 10.

The path is a closed curve consisting of seven cubic Bezier curves identified by the "C" draw command. The final "z" command closes the draw with the first point set in the "M" command.

According to the invention, the encoding of this SVG path comprises the following steps:
transforming at least one original draw command into an approximating draw command according to a geometrical approximation of the corresponding original portion of a drawing (a portion of the graphic represented by the SVG path), to obtain a reduced sequence;
encoding said reduced sequence into an encoded reduced sequence; and
encoding a reconstruction information set representing the difference between the reduced sequence and the original sequence.

The encoder parses the path sequence of FIG. 2 to determine a scaling factor of 10 000 so that it handles only integers, a list of commands, each having a type (or name) and integer values (the number of which per command is defined by the SVG standard), and the values of the arguments, here only coordinates (pairs of abscissa and ordinate).

The parsed information is:
parameters: scaling factor=10000
command type sequence: MCCCCCCCz
value sequence: 1657142, 3809336, 1540972, 3121730, 1671473, 2680800, 1857142, 2295050, 2160130, 1825486, 2516866, 1872163, 2904285, 1923621, 2904285, 1913621, 2914285, 1913621, 2914285, 1903621, 2914285, 1903621, 2924285, 1903621, 2924285, 1903621, 3353836, 2072530, 3773967, 2236000, 3914285, 2609336, 3948959, 3146579, 4274470, 3351436, 3828571, 4437907, 3003143, 5074644, 1724985, 6172611, 1657142, 3809336.

In a first step aiming at reducing the values to encode, the encoder applies a subsampling transformation on the data set. Two data sets are then obtained: the subsampled data and the supersampling data that enables the reconstruction of the original values from the subsampled values.

The subsampling transformation can be defined for instance according to the scaling factor.

In the present example, a subsampling of 12 bits could be used. However, for ease of reading, a base 10 subsampling is assumed, the first set obtained of sampled data then being Set A (11): 165, 380, 154, 312, 167, 268, 185, 229, 216, 182, 253, 187, 290, 192, 290, 191, 291, 191, 291, 190, 291, 190, 292, 190, 292, 190, 335, 207, 377, 223, 391, 260, 394, 314, 427, 335, 382, 443, 300, 507, 172, 617, 165, 380, while the second set of data is Set B (12): 7142, 9336, 972, 1730, 1473, 800, 7142, 5050, 130, 5486, 6866, 2163, 4285, 3621, 4285, 3621, 4285, 3621, 4285, 3621, 4285, 3621, 4285, 3621, 3836, 2530, 3967, 6000, 4285, 9336, 8959, 6579, 4470, 1436, 8571, 7907, 3143, 4644, 4985, 2611, 7142, 9336.

This first step provides a first approximation (Command sequence+Set A 11) of the original path sequence 10.

In a second step aiming at transforming the draw commands into simpler commands, the encoder tests whether the cubic Bezier curves defined by commands "C" can be approximated as lines, or other simple commands.

A mathematical distance between the cubic Bezier curve and the approximating line (defined by the two end points of the curve) is computed and serves as the main criterion for an approximation decision. The following table Table 1 lists the result of such calculation, where two distances as defined later (see description of FIG. 6) were computed for each curve:

TABLE 1 calculation of distances for approximation

| Command | Distance 1 | Distance 2 | Approximating command |
|---------|------------|------------|----------------------|
| C 154... | 19 | 12 | Line noted as "aL" for approximating line |
| C 216... | 34 | 17 | Line "aL" |
| C 290... | 0 | 0 | Point "aP" |
| C 291... | 0 | 0 | Point "aP" |
| C 335... | 11 | 22 | Line "aL" |
| C 394... | 3 | 40 | Line "aL" |
| C 300... | 84 | 225 | Quadratic curve "aQ" |

The approximating commands used in the invention may be SVG draw commands or extended draw commands. Further a particular "Point" command ("aP") may be used to specify the approximating command corresponding to an end point very close to a start point.

It can also be noted here that the approximating commands used to replace the original commands require fewer arguments: the point command does not require any coordinate, the line command requires one coordinate (i.e. an abscissa and an ordinate) and the quadratic curve command requires two, while the original cubic Bezier curve "C" command requires three coordinates.

As shown in the table, where the distances are small enough, curves are approximated as lines; where the distances are nearly zero, the final point of the curve is very close to the starting point so that curves are approximated as points; otherwise curves are approximated as quadratic curves. A "Point" command has no argument.

Following the approximating scheme set in the above table, two sets of data (or information) are generated from Set A 11:

a first one, namely Set A1 (13), which contains the resulting arguments after the approximation: only end coordinate of curves approximated as lines, no coordinate for curves approximated as points and two coordinates for commands approximated as quadratic curves (the end coordinates of the curve and a control point, in bold and underlined below, which may be computed from the two original control points of the original curve command, for example the barycentre):

Set A1: 165, 380, 185, 229, 290, 192, 391, 260, 382, 443, 236, 562, 165, 380 a second one, namely Set A2 (14), containing all the coordinates that have not been selected in set A1 but one control point coordinate for each curve approximated as quadratic, in bold and underlined below (which may be used with the above barycentre to retrieve the second original control point):

Set A2: 154, 312, 167, 268, 216, 182, 253, 187, 290, 191, 291, 191, 291, 190, 291, 190, 292, 190, 292, 190, 335, 207, 377, 223, 394, 314, 427, 335, 300, 507.

In parallel, information concerning the transformation of command types may be stored in memory: for example the first "C" command type has been replaced by an "aL" line command type, or the third "C" command type has been replaced by an "aP" line command type. For instance, the approximating command type sequence MaLaLaPaPaLaLaQz may be stored in addition to the original sequence MCCCCCCCz.

Following this second step the result is that Set A1, Set A2 and Set B have been produced with the approximating command type sequence. Set A1 contains few data compared to the original sequence but keeps the most important ones. Combined with the approximating command type sequence, it corresponds to an approximating SVG path.

Sets A1+A2 allow the reconstruction of a mid-size resolution version of the SVG path. While in the example all the approximating command types correspond to the original "C" command type, when needed, an additional item of information specifying how the original type can be retrieved from the approximating type may be associated with Set A2 as explained later.

Sets A1+A2+B allow full resolution rendering of the SVG path.

In a third step, the encoding parameters such as the scaling factor are encoded. Next, the obtained sets of information are encoded using a layer encoding scheme. This means that the lower resolution set of information (here Set A1) is first encoded, and then information (Set A2) that is additional to this set is encoded to obtain a higher resolution coded image, etc. until all sets (A1, A2 and B) have been encoded.

For instance, command types are first encoded where two implementations may be used:

all command types are encoded directly (containing extended types like 'approximated line curve' . . . ) before Set A1;

the encoding of the command types is split into two parts: before and after the encoding of Set A1. Since Set A1 uses a restricted set of command types (points, lines, quadratic, move-to, close), these restricted command types can be encoded before Set A1: for instance, sequence MaLaLaPaPaLaLaQz is first encoded. After the encoding of Set A1, information concerning the transformation of command types and which is necessary to go from that restricted set to the original SVG command set are encoded (points can be anything, lines can be curves, quadratics can be cubic curves . . . ): for instance sequence MCCCCCCCz is then encoded.

However, any other representation of this information enabling the reconstruction of the original commands may be used.

The arguments (here coordinates) are then processed, first encoding Set A1, and sequentially encoding Set A2 and B.

Each coordinate of Set A1 is first computed relative to the preceding one, to obtain a relative set A1: 165, 380, 20, −151, 105, −37, 101, −30, −9, 183, −24, 119, −71, −182.

Similarly, the values of Set A2 are computed according to their closest already encoded value from Set A1 and Set A2. This results in the following relative set A2: −11, −68, 13, −44, 31, −47, −37, −5, 37, 4, 1, −1, 0, −1, 0, 0, 1, 0, 0, 0, 43, 17 42, 18, 3, 54, 31, 21, −7, 64.

As can be seen from this example, the relative values tend to be smaller than absolute values, allowing a potentially more compact encoded representation.

Relative set A1 is then encoded using an Exponential Golomb coding scheme, except for the first two values which are linearly encoded since they can have a very different magnitude from the remaining values.

The Exponential Golomb code is a type of universal code, parameterized by a parameter k, that enables integers of arbitrary magnitude to be coded. The code can be implemented as follows:

1) If the integer I is positive, compute $J=2*I$, otherwise compute $J=1-2*I$
2) Write as many zero bits as the bit size of the binary representation of (J divided by $2^k$).
3) Write a '1' bit
4) Write the last k bits of the binary representation of J The k parameter of the Exponential Golomb code can be estimated via standard estimation of the geometric distribution parameter. In the example below, k could be set to 7.

Set A1 together with the approximating command type sequence form a base layer set referenced 13 in FIG. 2.

Similarly, the entire relative set A2 is encoded using an Exponential Golomb coding scheme with a k parameter for instance equal to 5.

Set A2 together with the original command type sequence (or any other information enabling reconstruction of the original command types from the approximating types) form a reconstruction high resolution layer set referenced 14 in FIG. 2.

Set B is then encoded using linear encoding as all values of set B are bounded by the power of two of the subsampling parameter.

Set B forms a reconstruction full resolution layer set referenced 12 in FIG. 2.

The encoding of the path element of SVG document 1 has been described here. The encoding of the other elements can be conducted with conventional method of the prior art.

Similarly, the invention applies to an SVG document comprising a plurality of paths. In such a case, the steps of applying a geometrical transformation and of encoding the transformed reduced sequence are applied to each path. Therefore, a first layer of encoded data corresponding to the document is formed. Next, the reconstruction information sets generated for each path are encoded, to create a supplementary layer. In this way, the layered decoding is facilitated.

A brief description will now be given of the decoding of such an encoded SVG document, and in particular of the encoded SVG path element.

Such a decoding method comprises:
receiving and decoding a first sequence from encoded SVG data to obtain an SVG path sequence of approximating draw commands;
determining if a new layer of encoded data has to be decoded;
in case of a positive determination, receiving and decoding an information set corresponding to a new layer, from the encoded SVG data;
transforming at least one approximating draw command of the decoded sequence into an upgraded draw command based on the decoded information set, to obtain an upgraded path sequence.

Considering in more detail, the decoder starts by decoding the parameters, such as the scaling factor and any flag specifying the chosen encoding options, and then the command types, either following option 1 (get all command type information at first) or using option 2 (gradually acquire the command types layer after layer).

The decoding of the base layer (or low resolution layer) starts by linearly decoding the initial coordinates. It then decodes all base layer values using an Exponential Golomb technique. At the end of the decoding of this layer, the decoder has decoded the whole relative set A1 and is able to reconstruct the original set A1.

The decoder can decide to stop the decoding at this stage, if constrained by lack of processing time, or lack of data, or if only a low resolution is expected. In this case, the above determination of a new layer to decode is negative, and then the process comprises:
converting at least one approximating draw command into an SVG path draw command or removing said approximating draw command to obtain a converted sequence;
rendering an SVG image on the basis of the converted sequence.

In this respect, the decoder needs to update the decoded data as follow:
the approximated points "a P" of the decoded sequence MaLaLaPaPaLaLaQz are eliminated from the data or converted to zero length curves;
the approximated lines "aL" are converted to standard SVG lines, using SVG "L" command for example; approximated quadratic "aQ" is converted into standard SVG quadratic "Q" command;
the values are super-sampled either individually or using a global scaling factor to recover an order of magnitude of the original values;
additional post-processing can be performed to improve the rendering quality as described later in relation to the enhancement of rendering.

If the decoder decides to go on with the decoding, it decodes the next encoded layer 14 (middle or high resolution layer) in the encoded document.

Depending on the encoding options, it may decode additional command type information, for instance the sequence MCCCCCCCz. It then decodes Exponential Golomb encoded values to obtain the relative set A2.

Value set A2 is then reconstructed which allows computation of the sub-sampled original SVG coordinates of Set A.

In case the resolution of Set A is sufficient, the decoder stops the decoding. It then performs super-sampling of the decoded values, for instance by using a global scaling factor. The command type sequence MCCCCCCCz and the values of Set A enable a high resolution rendering according to conventional methods.

Additional post-processing can be performed to improve the rendering quality.

In case the full resolution of the SVG path is desired, the decoder goes on and decodes the values of Set B (top or full resolution layer 12).

The latter allows directly reconstructing original SVG path values from Set A.

At this stage, it should be noted that optimisation techniques may be used to reduce the memory consumption: if only the base layer is to be decoded, memory allocation could be reduced to the exact number of set A1 values. On the contrary, if additional layers have to be decoded, a single value buffer can be allocated and progressively filled during the decoding.

From the above example, it can be seen that the encoder implementing the invention applies several successive transformations to the original SVG path which gives a final data set and several additional data sets that allow the quality of the data set to be improved by combining the layers 12, 13, 14. One of these transformations is an approximation transformation which has generally fewer arguments and thus reduces the number of values to know for a low resolution rendering of the path.

It may further ease the rendering process by only using commands that are very fast to render, mostly Point (no SVG command is processed in this case) or Line commands.

In addition, a specific succession of transformations and specific encodings are provided for the reduced data set and all complementary data (or reconstruction information sets) so that the overall compression remains almost as good as the best available SVG codecs.

At the decoding side, the decoder may selectively decode part of the encoded sets based on the expected rendering quality, availability of data, processing or memory power. It may then provide a partial decoding with low resolution rendering, as well as a progressive rendering if it refreshes the path rendering during the decoding process.

An embodiment of the invention is now described with reference to FIG. 3-7.

Figure 3:
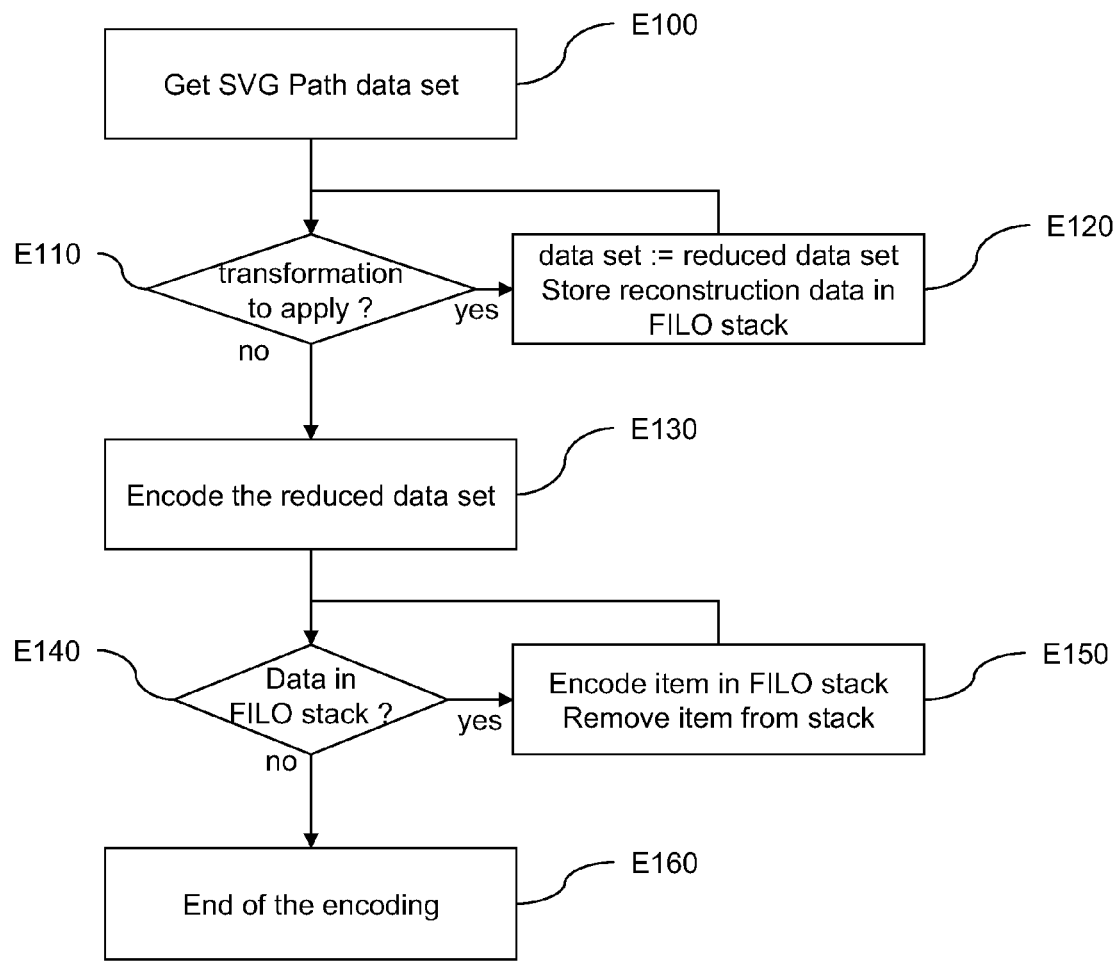
FIG. 3 depicts, in a flowchart, the general steps of an encoding method according to the invention.

FIG. 3 depicts, in a flowchart, the general steps of an embodiment of the encoding method according to the invention.

The encoding method uses an ordered set of transformations as exemplarily detailed below.

Each one of these transformations produces two sets of data from the input data: a reduced data set and a reconstruction information set.

The reduced data set is an approximation of the input data. It has a smaller intrinsic size and/or is well-adapted to be efficiently encoded. Typically, concerning the SVG path sequence, the reduced data or reduced sequence set contains a list of command types (generally the number of possible types is smaller in output of the transformation than in input) and a list of values, generally stored as integers.

The reconstruction information set is used by the inverse transformation to compute the original data set from the reduced data set. The reconstruction information set may contain an information set representing which inverse transformation should be used for each command of the reduced data set, and a set of values (stored as integers) or additional information (such as whether a particular command is absolute or relative). All values may be stored as integers with a known maximum value.

The encoder applies a set of transformations iteratively to the SVG path.

For each transformation, the encoder stores the reconstruction information set and uses the reduced data set as input to the next transformation.

After the last transformation has been completed, the encoder encodes first the final reduced data set.

Depending on the encoder setup (lossless compression, targeted size of the encoded file, etc.), it may also encode some of the reconstruction information sets generated by the transformations.

If all reconstruction information sets are encoded, the encoding is lossless. There are thus (n+1) generated layers, n being the number of transformations.

For such encoding, with reference to FIG. 3, the process starts by retrieving an SVG path data set (or sequence) to encode in step E100.

In step E110, the process checks whether a transformation has to be applied to the data set.

If so, it applies the transformation in step E120. The transformation generates a reduced data set which becomes the new data set for next iteration of step E110. The transformation includes transforming the original draw commands of the data set into approximating draw commands according to a geometrical approximation. The corresponding reconstruction information set is stored in a FILO (first in, last out) stack.

When all transformations have been applied (exit "no" of step E110), the final data set which is the reduced data set or reduced sequence is encoded in step E130.

Then, some or each reconstruction information set stored in the FILO stack is sequentially encoded and removed from the stack after the encoding (step E140 and step E150) and then the process ends (step E160).

In the resulting encoded document, the first layer (or base layer) is the reduced data and the other layers are each reconstruction information set generated by the transformations and are sorted in the opposite order to their production.

If lossy compression is authorized, the encoding process may stop before all stack items are encoded (for instance after the encoding of a given number of stack items or whenever a criteria like minimum error distance is fulfilled).

To provide efficient coding, one transformation of the invention is an approximation transformation converting an SVG command into an approximating command as described in more detail later.

Other transformations, such as a rewriting transformation and/or a quantization transformation, although useful in most cases, may be optional in various cases: for example, if the data are already low resolution data.

Figure 4:
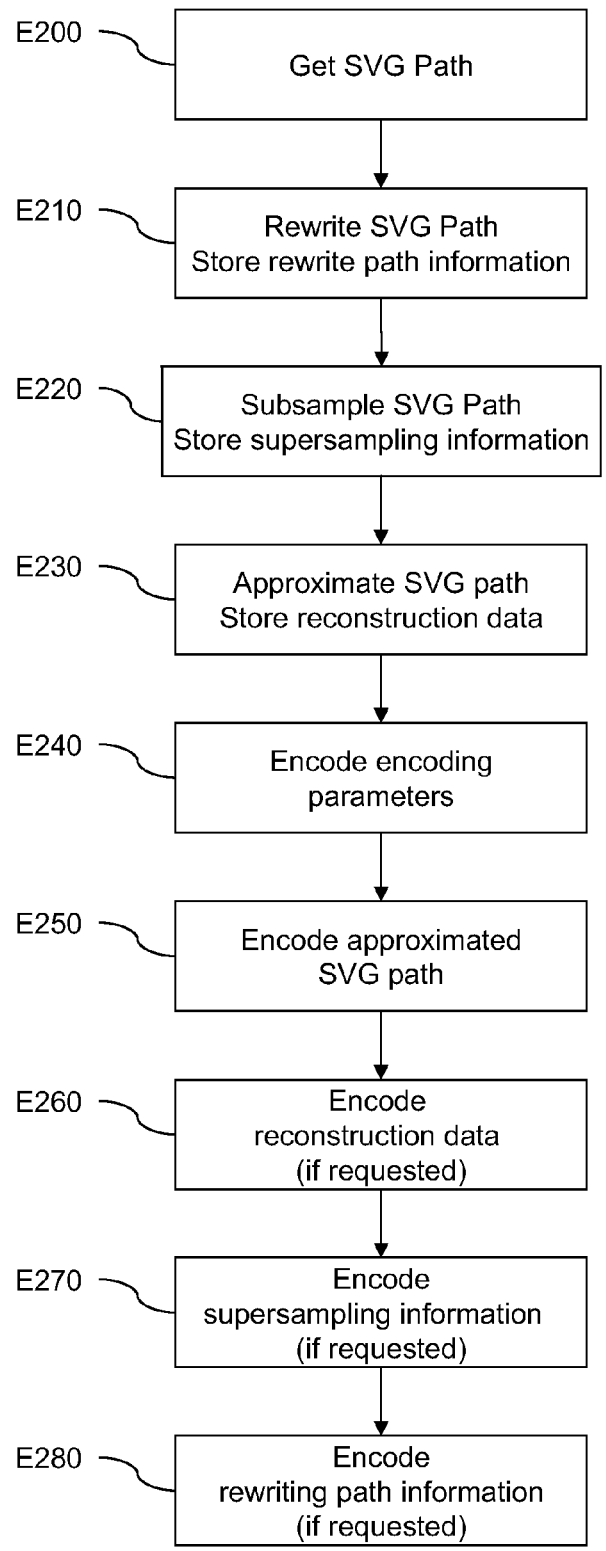
FIG. 4 depicts, in a flowchart, a detailed embodiment of the encoding method according to the invention.

With reference to FIG. 4, a detailed embodiment of the encoding method according to the invention is now described. In this embodiment, the encoder applies three transformations in the following order:

- a rewrite transformation to simplify the SVG path, converting it into all absolute or all relative values;
- a quantization or subsampling transformation, typically a linear transformation, to split data into low resolution and high resolution data;
- an approximation transformation to split the low resolution data into two additional layers: an even lower resolution data set and a reconstruction (for higher resolution) information set.

In the first step E200 of FIG. 4, the SVG path (20) to encode is obtained.

The path data is then optionally rewritten in step E210 to get a simpler but equally rendered version of the SVG path. Two rewriting operations may be conducted in combination or alternatively.

The first one concerns the rewriting of all the values of the SVG path sequence into either only relative or only absolute values.

For example, if rewriting all the values of coordinates as relative values, this step comprises first updating the command type names by replacing uppercase command type names by lowercase command type names: for example "C" into "c".

Secondly, all absolute coordinates are replaced by relative coordinates which are computed from those absolute coordinates and the previous coordinates in the SVG path. For example, the path "M 100 100 L 200 150 L 100 150 L 100 100" is replaced by the relative path "m 100 100 l 100 50 l −100 0 l 0 −50".

This has the first advantage of reducing the number of commands used. Moreover, usually the value of the relative coordinates is smaller than the value of the corresponding absolute coordinates. In addition, all coordinates are more homogeneous.

It should be noted that according to the SVG specification, if the first path command is a relative path command, it is interpreted as an absolute command. This allows the preprocessing step to rewrite all commands, even the first one.

The second rewriting operation is to use the best command form for each command in the path. Several commands have shortcuts for specific cases. For example, the "lineto" command has a "horizontal-lineto" (or respectively "vertical-lineto") shortcut for the case when the line is to be horizontal (or respectively vertical). By applying this rewriting scheme, the command "l 5 0" is replaced by the equivalent command "h 5" with less information. Here, an equivalent command is understood as a command producing the same graphical result.

Using the most specific command for each case allows the number of arguments in the original path to be reduced.

This rewriting transformation of step E210 produces a rewritten SVG path (21) and reconstruction information (22) that makes it possible to go from rewritten to original form. They are both stored in memory for next processing steps. Typically this additional information may consist in a Boolean value for each command stating whether it is relative or absolute. In the case of h or v commands, it can also state whether they are originally h, v or l commands.

Arithmetic coding or similar techniques may be used to compress this type of data. In an efficient implementation, all values are rewritten as absolute to ease the path data subsampling transformation.

Following step E210, rewritten path values are subsampled in step E220. To do so, the SVG path is parsed and rearranged to separately list the parameters, the command type sequence (set of all path commands) and the argument values as already described above.

Figure 5:
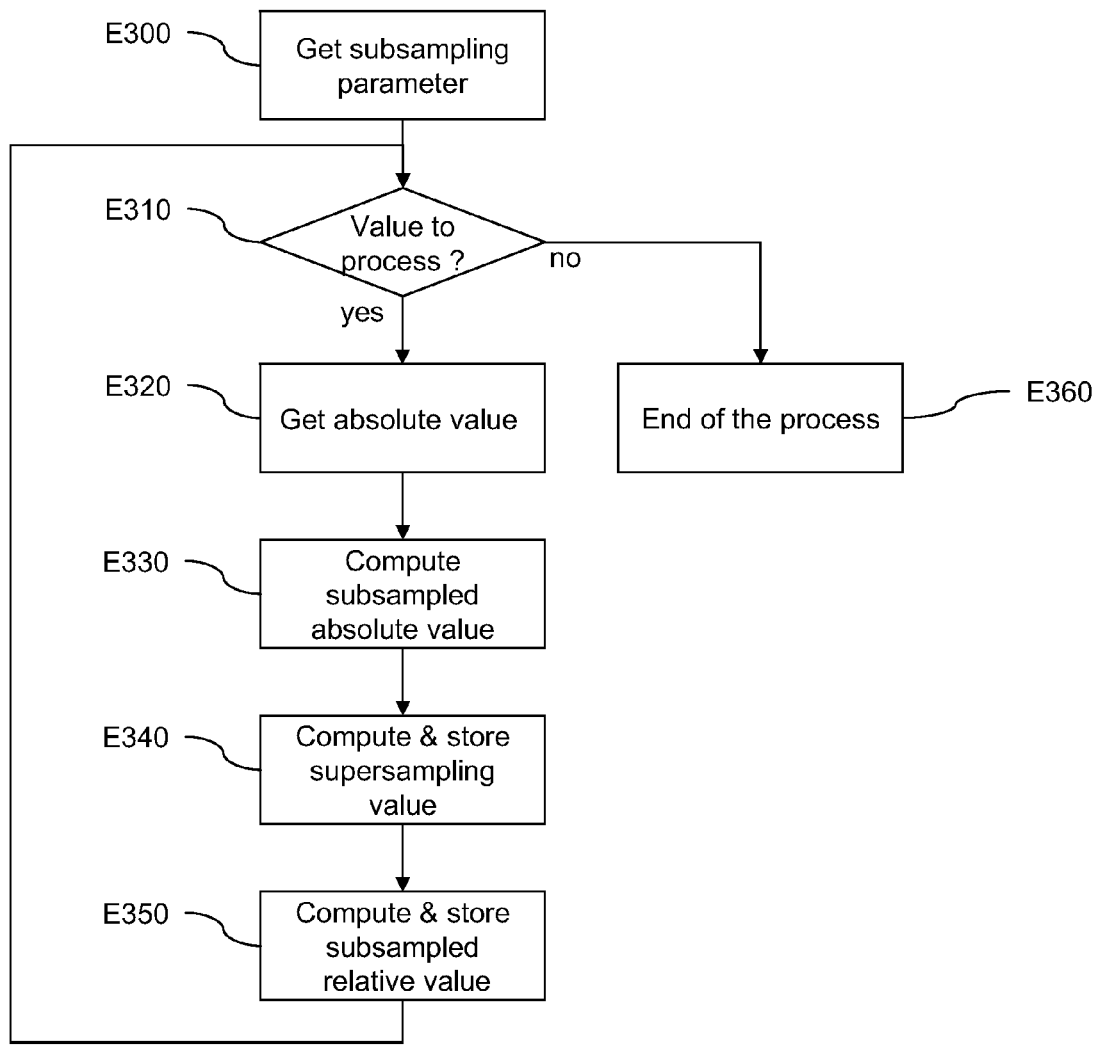
FIG. 5 depicts, in a flowchart, the subsampling on the absolute representation of the coordinate values implemented in the process of FIG. 4.

FIG. 5 illustrates the subsampling on the absolute representation of the coordinate values. For better efficiency, only the values of coordinates are subsampled in step E210 as described. Others arguments like radius or axis are literally encoded. However, in a specific embodiment, these others arguments may also be subsampled.

The absolute representation is used so as not to include additive rounding noise, which could lead to substantial visual artefacts.

Given a subsampling parameter (step E300), as long as there is a value to process (step E310), its absolute value is retrieved (or computed if it is available as relative) in step E320.

This absolute value is then quantized according to the subsampling factor to get the absolute subsampled value at step E330.

The supersampling information (which is in fact the difference between the original value and subsampled or quantized value), that makes it possible to go from the subsampled value to the original value, is computed and stored at step E340 and the relative subsampled value is computed and stored in step E350.

When no further value has to be processed, the process ends at step E360.

As a result of step E220, the set of all values is divided into two sets: subsampled relative or absolute coordinate values which, when combined with the command type sequence, correspond to a low resolution data set (23) and supersampling information (24). The latter, namely a reconstruction information set, makes it possible to go from the low resolution to the original value or to a value reasonably close to the original value.

If more sets are expected, the same process can be repeated.

Following step E220, path commands are then approximated according to their types and values at step E230.

Figure 6:
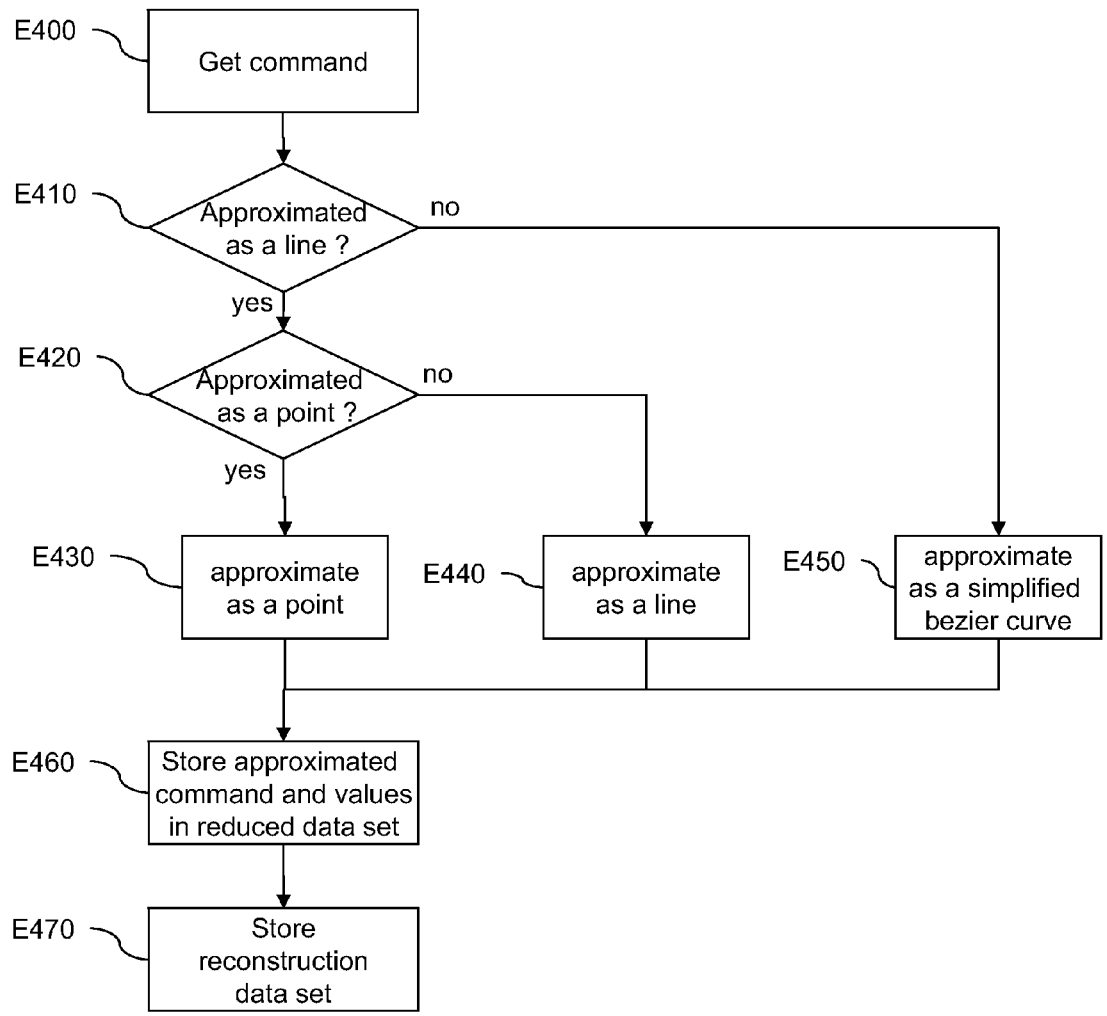
FIG. 6 depicts, in a flowchart, an exemplary approximating process for a cubic curve as shown in FIG. 1

In one embodiment of the invention, the classification consists in approximating the commands as three potential "approximating" types: points, lines and quadratic curves, with reference to FIG. 6.

Figure 1:
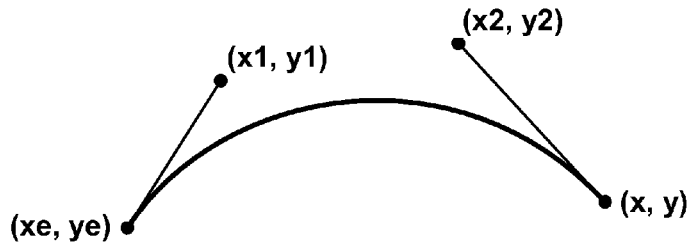
FIG. 1 illustrates the parameterization of a cubic curve command according to the SVG standard.

A description is given hereafter of the approximation of cubic curves shown in FIG. 1 in one of these three potential "approximating" command types.

It is to be understood that the present invention is not limited to this approximation. To illustrate, any SVG command may be approximated into a less argument-consuming SVG command or into a point approximating command: for example, a line command into a point command, a quadratic curve command into a line or point command, an arc curve command into a quadratic, line or point command.

However, command types "M/m" and "Z/z" are not approximated and then can be added as such in an approximating command type sequence aimed at listing the approximating command types resulting from step E230.

Returning to the geometrical approximation of cubic Bezier curve commands into simpler commands such as points, lines or quadratic curves, it is to be noted that this approximation enables:

reduction in the number of values of approximating commands, simplification of the rendering of approximating commands.

As can be seen, approximated points require no value encoding since the outline of the shape remains at the same point; lines require the encoding of two values (one coordinate) and quadratic curves the encoding of four values.

It should also be noted that points, lines and quadratic curves are faster to render than general cubic curves at the decoder side. Typically, points do not need to be rendered; lines are rendered faster than quadratic curves which are rendered faster than cubic curves. This approximation process can be easily extended to approximate cubic curves as smooth cubic curves, thereby also reducing the number of coordinate values from 6 to 4.

The approximation process of each command of the path starts at step E400 by retrieving that command.

At step E410, it is determined whether the command can be approximated as a line. This test can be implemented in different ways as following.

In a first way, the maximum distance between any point of the original command curve and the approximating curve (line, quadratic, smooth cubic curve) is first computed. This distance can be compared to a given threshold to determine which approximation is the most appropriate one.

The distances of a cubic curve to its approximating line can also be estimated as the norms of the orthogonal projections of vector (x1-xe, y1-ye) and vector (x-x2,y-y2) on a perpendicular to the line (x-xe,y-ye). These norms can be computed from the vectorial product between vectors (x1-xe, y1-ye) (respectively (x-x2,y-y2)) and vector (x-xe,y-ye). Table 1 shows the results of computed distances for vector (x1-xe, y1-ye) (Distance 1) and for vector (x-x2, y-y2) (Distance 2).

Once these two distances are known, a command can be approximated as a line if, for instance, both distances are below a given threshold, as shown in the above table for example. In order to limit the calculations, the threshold value is generally chosen as a maximum deviation allowed for the path.

Alternative criteria to the above distance can be used, for instance the potential compression loss triggered by encoding (x-xe,y-ye), (x1-xe,y1-ye) and (x-x2,y-y2) compared to an encoding of (x1-xe,y1y-e), (x2-x1,y2-y1) and (x-x2,y-y2).

In case the command can be approximated as a line (exit "yes" at step E410), it is tested at step E420 whether the command can be approximated as a point which offers a better compression of arguments.

This test E420 is based on the size of the norms of the vectors (x1,y1), (x,y) and/or (x-x2,y-y2).

If these norms are below a given threshold, the command is approximated as a point at step E430, meaning that an approximating point command "aP" is added to the approximating command type sequence. Further, all three coordinates (x1,y1), (x2,y2) and (x,y) are put in the reconstruction information set and no value of this command is kept in the reduced data set.

In case of a negative answer at step E420, the command is approximated as a line at step E440. In such a case, an approximating line command "aL" is added to the approximating command type sequence and only the (x,y) coordinates are kept in the reduced data set and the (x1,y1) and (x2,y2) coordinates are put in the reconstruction information set.

Otherwise, the cubic curve command "C" is approximated as a simplified Bezier curve in step E450, typically as a quadratic curve.

In such a case, a specific control point for the quadratic curve is computed. The barycentre (xm,ym) of the coordinates (x1,y1) and (x2,y2) is selected as it is generally a good enough rendering approximation and is also good in terms of global compression. (xm, ym) and (x,y) are then added to the reduced data set while an approximating quadratic curve command "aQ" is added to the approximating command type sequence.

Next, either x1 or x2 and y1 or y2 is added to the reconstruction information set, based on the proximity of (xm,ym) to (x,y). If the barycentre is close to the starting point of the curve, x1 and y1 are selected. If the barycentre is close to (x,y), x2 and y2 are selected.

Some curves can also be approximated as smooth cubic curves in which case only the (x2,y2) values are kept in the reduced data set.

Step E460 shows the storage of the resulting approximating command type and the selected values.

The non selected values and information about the original command type before approximation are stored together in the reconstruction information set, at step E470.

Resulting from these steps, two sets of data are built:
  the reduced data set 25 that contains approximating commands with a restricted command type set and a small set of values. This data set is the data encoded in the base layer;
  a reconstruction information set 26 that makes it possible to go from the approximated data (of the reduced data set 25) to the original data. Typically, this reconstruction information set contains the original command type and removed values and will be encoded in the second layer.

In practice, cubic curve "C" commands can often be approximated as lines, meaning that a reduction from six argument values to two may be often obtained.

Figure 4A:
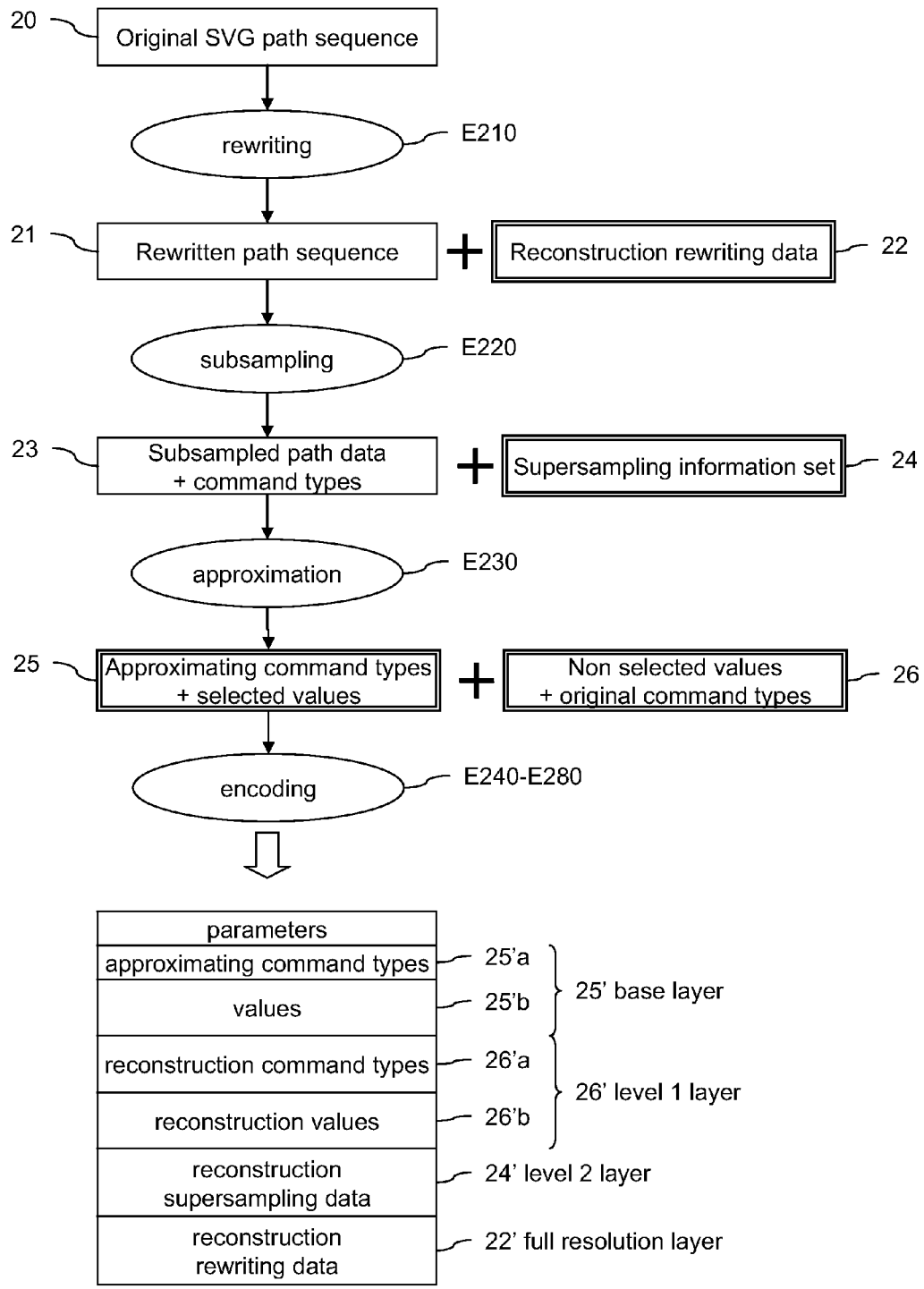
FIG. 4a illustrates the building of the reduced data set and the reconstruction set according to the invention, and the encoding thereof.

FIG. 4a shows how the different data sets 20-26 are successively produced.

Back to FIG. 3, step E230 is followed by step E240 which starts the encoding part of the method.

It first writes at step E240 the encoding parameters.

These may contain a scaling factor, the subsampling ratio used, specific internal encoding parameters (Huffman table ids, Exponential-Golomb parameter, etc.).

At step E250, the reduced data set 25 from step E230 is encoded as a base encoded layer 25'.

The base layer data contains a set of command types 25'a (line, curve, etc) and a set of values 25'b (set A1 in the above example).

Command types in the base layer are a smaller set of command types than SVG command types. These commands are encoded using general lossless compression techniques, for instance Huffman coding with pre-defined Huffman tables.

Typically, approximating lines are more frequent than quadratic curves. Approximating points largely depend on the subsampling.

Therefore, several Huffman tables can be defined and the best one is selected by the encoder.

Other techniques (arithmetic coding, prediction partial matching, etc.) can also be used.

Following the encoding of the approximating commands, the coordinate values are encoded.

These values are encoded relatively to each other. These values can be seen as a series of x and y values. The value $x_n$ is then encoded relatively to the value $x_{n-1}$ and the value $y_n$ according $y_{n-1}$ using Exponential-Golomb encoding. This encoding takes a parameter k as input. This parameter is computed based on the geometric distribution of the values. As the value set is already subsampled, the optimal value k is generally close to zero and often equal to zero.

$x_0$ and $y_0$ are linearly encoded as they can take any arbitrary value.

If the k value of the Exponential-Golomb code is not equal to zero, the encoded values may be split into two streams: the first stream contains the high order information (i.e. the values divided by $2^k$), the second stream containing the low order information (i.e. the last k bits of the binary representation of the values).

Following encoding step E250, in an optional step E260, the reconstruction information set (26) that makes it possible to go from the approximating values (25) to the subsampled values (23) are encoded (encoded portion 26' is obtained). This corresponds to the encoding of Set A2 as explained above using Exponential-Golomb encoding with relative values.

Subsampled reconstruction data (26) needs to contain both the information necessary to reconstruct the command type and the values before the approximation process was carried out.

As the base layer has already been decoded when processing this data, the approximating command type is known. This approximating command type is used to restrict the set of possible available commands.

For instance, approximating quadratic curves may only lead to either quadratic curves or cubic curves but not lines. Original command types are thus encoded according to their approximating command type using Huffman coding. An encoded portion 26'*a* of command types is thus obtained. Other techniques (arithmetic coding, prediction partial matching . . . ) can also be used.

Original coordinate values are also encoded according to the base layer coordinate values. In the case of points, all original values are encoded using Exponential-Golomb encoding as done for base layer values, with a k parameter generally equal to zero. An encoded portion 26'*b* of values is thus obtained.

For curves approximated as lines, (x1,y1) and (x2,y2) are encoded: (x1-xe,y1-ye) is directly encoded using Exponential-Golomb encoding as it should be small and (x-x2,y-y2) is encoded using Exponential-Golomb encoding, as (x2,y2) should be close to already known (x,y).

For approximated quadratic curves, since the barycentre (xm,ym) of (x1,y1) (x2,y2) is known, only (x1,y1) or (x2,y2) is encoded and the remaining coordinates can be computed from (xm,ym). To encode the smallest possible values using Exponential-Golomb encoding, the following algorithm is used:

if (xm,ym) is closer to (0,0) than to (x,y), encode (x1,y1) using Exponential-Golomb;

if (xm,ym) is closer to (x,y) than to (0,0), encode (x-x2,y-y2) using Exponential-Golomb.

After step E260, the supersampling information 24 (Set B in the above example) is then optionally encoded at step E270 to allow reconstruction of the original rewritten path data (21). An encoded supersampling information portion 24' is thus obtained in the encoded document 30.

Super-sampling information may contain some command type information, in which case encoding techniques like the ones used for the data reconstruction information are used.

Otherwise, the supersampling information can be encoded with a mix of two techniques: Exponential-Golomb and linear encoding. Exponential-Golomb encoding can be used when the value prior to supersampling information is equal to zero, especially if the super-sampling information contains information bigger than one pixel.

Otherwise linear encoding can be used as the super-sampling information is composed of integers with a bounded value ($2^n$, n being the subsampling factor).

If the amount of supersampling information is large, for instance if encoded values are bigger than 256, this super-sampling information can be split into several sub-layers.

The encoding process goes on at step E280 where, optionally, the rewriting information for reconstruction (22) is also encoded into a portion 22', so as to allow a faithful reconstruction of the original path sequence.

These optional steps in the encoding process make it possible to reduce the size of the encoded SVG document. Its transmission is therefore made more efficient, in particular when transmission network bandwidth is low or when storage capacities are low.

FIG. 4*a* shows the portions of resulting encoded SVG document 30 with the successive encoded portions 25', 26', 24', 22' corresponding to the encoded SVG path. By ordering the encoded portions as shown in the figure, the decoder may decode the image on the fly since the base layer is first in the encoded stream. Progressive rendering on the fly is thus possible.

In the case an SVG document comprises several paths, progressive decoding may be achieved for the entire document by decoding first the base layer encoded for each path, and then the following layers for each path.

Figure 7:
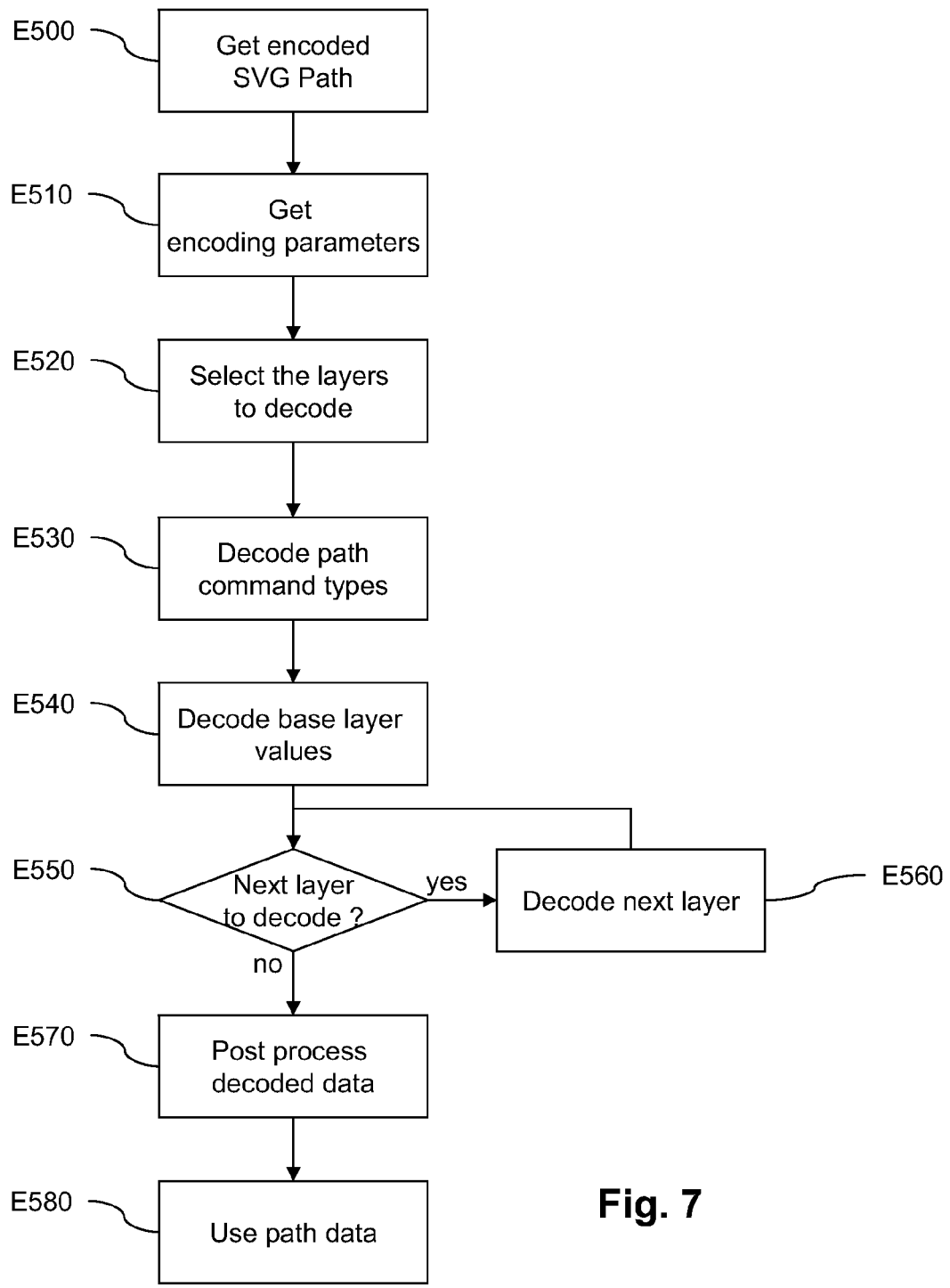
FIG. 7 depicts, in a flowchart, a decoding process according to the invention.

Turning now to the decoding side with reference to FIG. 7, the decoder starts in step E500 by retrieving a given encoded SVG path 30 to decode.

This data may contain all encoded layers 25', 26', 24', 22' or only some of them at the time of the start of decoding.

The decoder extracts the encoding parameters (subsampling, scaling factor, etc) in step E510.

In step E520 the decoder then selects the layers to decode according the expected rendering quality or the expected display resolution.

For example, if only a thumbnail is requested, minimal decoding can be carried out. On the contrary, if full resolution representation of the SVG document is expected, all data should be decoded.

Steps E530 and E540 perform the decoding of the base layer corresponding to the portion 25' of document 30. The decoding of each layer is symmetrical with respect to its encoding.

The base layer decoding starts, in step E530, by decoding the command types 25'*a* of the base layer.

Based on the commands, the decoder decodes the base layer values 25'*b* in step E540 given the appropriate exponential-Golomb parameter. This is because each approximating command type has a predefined number of arguments.

If the SVG decoder knows that it will stop decoding just after the base layer, it may decide to allocate an array only for the restricted values (nothing for points, 2 values for each line and 4 values for each quadratic curve). Otherwise, an allocation of enough memory for storing the values that will be decoded in the next layers (reconstruction 26', supersampling 24' and rewriting 22' layers) may be given.

The first case allows potentially substantial memory consumption reduction.

In addition, since only lines and quadratic curves will be rendered, the rendering process should also be faster.

To directly render base layer data, a super-sampling of the data is conducted according to the subsampling parameter. This is for example done by multiplying the scaling factor by the power of two of the subsampling parameter.

At that point of the decoding process, the decoder may render a low resolution version of the SVG path, for a preliminary display of the SVG image to a user. In such a case, post-processing may be performed as explained later for enabling the display. This allows a preliminary representation to be provided to the user before the whole of the data has been decoded.

The decoder continues the decoding as long as it needs to improve the overall quality of the path.

In step E550, the decoder checks whether there is an additional layer to decode and whether it should decode it.

If so, the decoder decodes the additional layer in step E560.

The first additional layer to decode may be the reconstruction layer 26'. Its decoding consists in decoding the command values 26'*b* that have not been encoded in the base layer, as well as information 26'*a* to update/detail the command types.

During this step, these decoded data of layer 26' are combined with those of step E530 and E540 to reconstruct the subsampled data 23, i.e. an upgraded set of path data.

The other layers 24' and 22' may be successively decoded to successively reconstruct the rewritten path sequence 21 and the original SVG path sequence 20.

Again, each time a layer is decoded, the display may be progressively updated with the upgraded path data 23, 21 and then 20. The user is then provided with feedback much faster than by waiting for all the layers to be decoded before displaying the SVG image.

The decoder then goes back to step E550.

When all required layers are decoded, the decoder post-processes the data in step E570.

This post-processing may be scaling of the path data, or super sampling of the data.

Finally the decoded SVG path data is obtained and is used in step E580, for example for display.

It is to be noted that for the rendering of a layer comprising approximating command types, those types which are not SVG command types must be converted for compliance with the SVG decoder: for example conversion of "aL" commands into "L" SVG commands; "aP" commands are removed and "aQ" commands are converted into "Q" SVG commands.

In an embodiment of the invention, the rendering of the base layer may be substantially improved by specific techniques that take into account the nature of the transformations. Despite the fact that these techniques consume some processing time and power, they are especially suitable for scenarios where data is slower to read than to process, typically low bandwidth scenarios or high volume scenarios.

These techniques may consist in:
- a linear to cubic prediction by applying smoothing to the lines. A more visually pleasant rendering is readily achieved.
- a quadratic to cubic prediction where a smoothing transformation is applied as well as an automatic projection of the quadratic control point.

It is shown from the above that the present invention provides an efficient encoding method for an SVG path
- allowing layered encoding and decoding of an SVG path, which in turn, allows partial decoding and progressive rendering;
- lossless compression almost as good as best available codecs in terms of compression.

Figure 8:
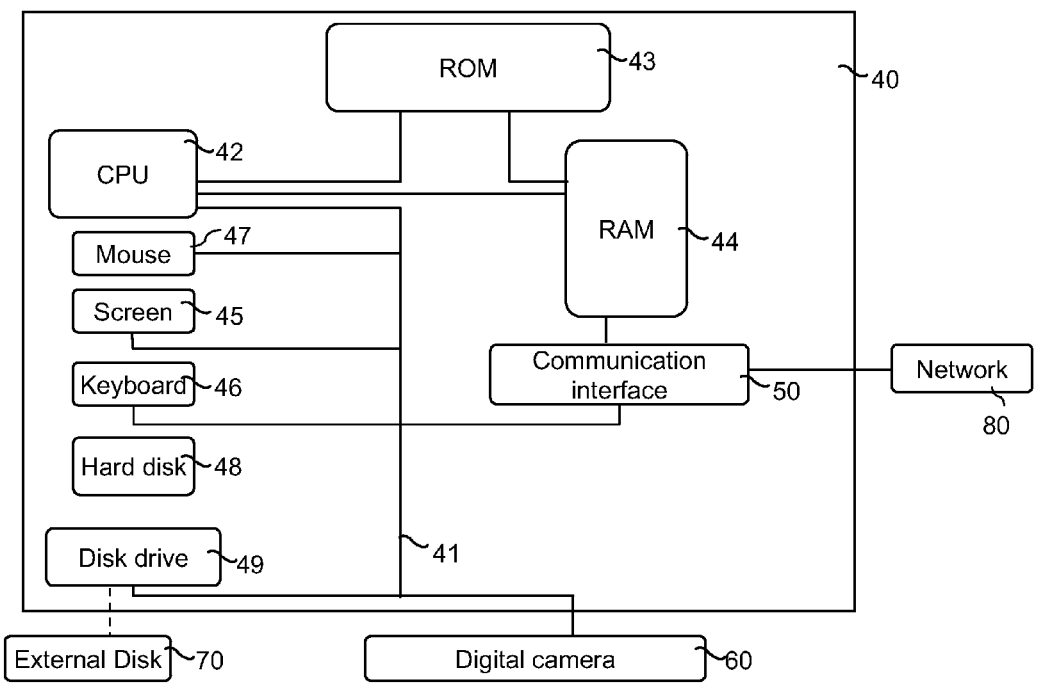
FIG. 8 schematically depicts a particular hardware configuration of an information processing device adapted for an implementation of the method according to the invention.

With reference to FIG. 8, a description is now given by way of example of a particular hardware configuration of an information processing device adapted for an implementation of the method according to the invention.

An information processing device implementing the present invention is for example a micro-computer 40, a workstation, a personal assistant, or a mobile telephone connected to different peripherals. According to still another embodiment of the invention, the information processing device takes the form of a camera provided with a communication interface to enable connection to a network.

The peripherals connected to the information processing device comprise for example a digital camera 60, or a scanner or any other means of image acquisition or storage, connected to an input/output graphics card (not shown) and supplying multimedia data to the information processing device.

The device 40 comprises a communication bus 41 to which there are connected:

A central processing unit CPU 42 taking for example the form of a microprocessor;

A read only memory 43 in which may be contained the programs whose execution enables the implementation of the method according to the invention;

A random access memory 44, which, after powering up of the device 40, contains the executable code of the programs of the invention as well as registers adapted to record variables and parameters necessary for the implementation of the invention;

A screen 45 for displaying data and/or serving as a graphical interface with the user, who may thus interact with the programs according to the invention, using a keyboard 46 or any other means such as a pointing device, for example a mouse 47 or an optical stylus;

A hard disk 48 or a storage memory, such as a compact flash type card, able to contain the programs of the invention as well as data used or produced on implementation of the invention;

An optional disk drive 49, or another reader for a removable data carrier, adapted to receive an external disk 70 and to read/write thereon data processed or to process in accordance with the invention; and A communication interface 50 connected to the telecommunications network 80, the interface 50 being adapted to transmit and receive digital data.

The communication bus 41 permits communication and interoperability between the different elements included in the device 40 or connected to it. The representation of the bus 41 is non-limiting and, in particular, the central processing unit 42 unit may communicate instructions to any element of the device 40 directly or by means of another element of the device 40.

The external disks 70 can be any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the information processing device to implement the invention may equally well be stored in read only memory 43, on the hard disk 48 or on a removable digital medium such as an external disk 70 as described earlier. According to a variant, the executable code of the programs is received by the intermediary of the telecommunications network 80, via the interface 50, to be stored in one of the storage means of the device 40 (such as the hard disk 48) before being executed.

The central processing unit 42 controls and directs the execution of the instructions or portions of software code of the program or programs of the invention, the instructions or portions of software code being stored in one of the aforementioned storage means. On powering up of the device 40, the program or programs which are stored in a non-volatile memory, for example the hard disk 48 or the read only memory 43, are transferred into the random-access memory 44, which then contains the executable code of the program or programs of the invention, as well as registers for storing the variables and parameters necessary for implementation of the invention.

It will also be noted that the device implementing the invention or incorporating it may also be implemented in the form of a programmed apparatus. For example, such a device may then contain the code of the computer program(s) in a fixed form in an application specific integrated circuit (ASIC).

The device described here and, particularly, the central processing unit 42, may implement all or part of the processing operations described in relation to FIGS. 3 to 7, to implement each method of the present invention and constitute each device of the present invention.

The preceding examples are only embodiments of the invention which is not limited thereto.

In particular, although the detailed description shows a unique approximating transformation (step E230), several of such transformations may be iterated on the resulting reduced data set 25. This may produce more layers and thus a greater choice of resolutions for the decoder to obtain the best rendering for a specific display or rendering device.

In such a case, the several approximating transformations may differ regarding the threshold values used in step E230 to consider a particular approximating draw command. Small values may be used first to produce high resolution layers and corresponding reconstruction information set, and then bigger values may be used to produce lower resolution layers.

Alternatively, the set of approximating commands may be changed and reduced as the iterations progress.

According to another aspect, although the layered encoding of one SVG path has been described, encoding of an SVG document generally involves the encoding of several paths. The present invention may be easily extended so that the whole SVG document is encoded as layers.

In such a case, the SVG document is encoded normally, the SVG path data containing only the base layer information. The concatenated second layers of the SVG paths of the document are inserted at the end of the encoded document, then the third layers are inserted after the second layers and so on.

Based on this layering technique, careful selection of encoding parameters allows layers to be constructed with reasonable sizes: a first layer with a very small amount of memory and further layers equally sized or progressively increasing in size. This allows easier management of SVG data transmission and progressive rendering.

The invention claimed is:

1. A method of encoding, in a graphics description language, a path used to reproduce a rendering of an original geometrical shape, the path comprising an original sequence of original draw commands, each original draw command comprising a draw command type and a set of arguments, the method comprising the following steps:
   (a) transforming the original sequence of the original draw commands into at least two data sets, with (i) a first data set comprising draw commands that include each of the draw command types of the original sequence and a portion of the arguments that is less than the entire set of arguments of the original sequence, the first data set enabling a lower resolution rendering of the original geometrical shape, and (ii) a second data set comprising the remaining arguments of the original sequence that are not included in the first data set, the second data set enabling a full resolution rendering of the original geometrical shape;
   (b) replacing at least one of the draw commands of the first data set with an approximating draw command to obtain a reduced sequence, wherein the reduced sequence has the same number of draw command types as the original sequence and each approximating draw command has fewer arguments than that in the first data set and is different from the first data set; (c) encoding the reduced sequence into an encoded reduced sequence, the encoded reduced sequence enabling a low resolution rendering of the original geometrical shape;
   (d) encoding a reconstruction information set representing the difference between the reduced sequence and the first data set, the reconstruction information set defining additional information to the reduced sequence, enabling a higher resolution rendering of the original geometrical shape; and
   (e) encoding the second data set, such that a combination of the encoded reduced sequence, the encoded reconstruction information set, and the encoded second data set allow for a complete reconstruction of the original sequence, enabling the full resolution rendering of the original geometrical shape.

2. The method according to claim 1, wherein the step of replacing comprises computing a distance between a rendering of an original portion of the original geometrical shape defined by at least one of the original draw commands and a rendering of an approximate portion defined by the approximating draw command, and comparing the calculated distance with at least one threshold value.

3. The method according to claim 1, wherein the reconstruction information set comprises:
   the original draw command types that have each been transformed into different approximating draw command types, and
   arguments of the original draw command that have not been kept in the approximating draw command and/or arguments calculated from the arguments of the original draw command and enabling the retrieval of arguments that have not been kept in the approximating draw command.

4. The method according to claim 1, comprising a plurality of iterative transformations of the original sequence, including an approximating transformation according to a geometrical approximation,
   the reduced sequence resulting from the last transformation being encoded and at least one of the reconstruction information sets of the transformations being encoded.

5. The method according to claim 4, wherein each of the reconstruction information sets is encoded.

6. The method according to claim 4, wherein a transformation prior to the approximating transformation comprises rewriting the original path sequence by replacing a draw command by an equivalent draw command having fewer arguments.

7. The method according to claim 4, wherein a transformation prior to the approximating transformation comprises a step of sub-sampling the original sequence or the rewritten sequence to obtain a sub-sampled sequence and the reconstruction information set that comprises the super-sampling information enabling the reconstruction of the original or rewritten sequence from the sub-sampled sequence.

8. The method according to claim 1, wherein the reduced sequence is first encoded before any reconstruction information set.

9. The method according to claim 8, wherein the reduced sequence comprises a sequence of values corresponding to arguments of the commands within the reduced sequence, and
   the values of a first coordinate of the reduced sequence are linearly encoded as absolute values, and the values of other coordinates are encoded relatively to the values of a preceding coordinate within the sequence.

10. A method of decoding data encoded according to the method of claim 1, the method comprising the following steps:
    receiving and decoding the encoded reduced sequence, enabling a low resolution rendering of the original geometrical shape; and
    determining if a new layer of encoded data has to be decoded;
    wherein responsive to a positive determination, the method further comprising:
    receiving and decoding the encoded reconstruction information set corresponding to a new layer, from the encoded data, in order to obtain an upgraded sequence of draw commands enabling a higher resolution rendering of the original geometrical shape; and
    replacing at least one approximating draw command of the decoded reduced sequence with an upgraded draw command, the upgraded draw command comprising more arguments than the approximating draw command using information contained within the decoded information set and being different from the approximating draw command.

11. The decoding method according to claim 10, wherein the steps of receiving and decoding the information set and of replacing are iterated on the upgraded sequence, as long as a new layer of encoded data has to be decoded.

12. The decoding method according to claim 10, comprising, in case of a negative determination, converting at least one approximating draw command into an original draw command of the original sequence or removing the approximating draw command, to obtain a converted sequence; and rendering an image on the basis of the converted sequence.

13. The decoding method according to claim 12, wherein the removing of the approximating draw command is performed when the approximating draw command corresponds to a point command.

14. A device comprising at least one processor, for decoding data encoded according to the method of claim 1, the device comprising:

a receiving unit to receive, and a decoding unit to decode, the encoded reduced sequence, enabling a low resolution rendering of the original geometrical shape; and a determination unit to determine if a new layer of encoded data has to be decoded, wherein, responsive to a positive determination, the receiving unit receives, and the decoding unit decodes, the encoded reconstruction information set corresponding to a new layer, from the encoded data, in order to obtain an upgraded sequence of draw commands enabling a higher resolution rendering of the original geometrical shape, and a replacing unit replaces at least one approximating draw command of the decoded sequence with an upgraded draw command, the upgraded draw command comprising more arguments than the approximating draw command using information contained within the decoded information set and being different from the approximating draw command.

15. A non-transitory computer-readable storage medium comprising instructions for a computer program adapted to implement the method according to claim 1 when the program is loaded and executed by the computer system.

16. A non-transitory computer program product readable by a microprocessor, comprising portions of software code adapted to implement the method according to claim 1 when it is loaded and executed by the microprocessor.

17. A device comprising at least one processor, for encoding, in a graphics description language, a path used to reproduce a rendering of an original geometrical shape, the path comprising an original sequence of original draw commands, each original draw command comprising a draw command type and a set of arguments, the device comprising:

a transforming unit to transform the original sequence of the original draw commands into at least two data sets, with (i) a first data set comprising draw commands that include each of the draw command types of the original sequence and a portion of the arguments that is less than the entire set of arguments of the original sequence, the first data set enabling a lower resolution rendering of the original geometrical shape, and (ii) a second data set comprising the remaining arguments of the original sequence that are not included in the first data set, the second data set enabling a full resolution rendering of the original geometrical shape;

a replacing unit to replace at least one of the draw commands of the first data set with an approximating draw command to obtain a reduced sequence, wherein the reduced sequence has the same number of draw command types as the original sequence and each approximating draw command has fewer arguments than that in the first data set and is different from the first data set; and an encoder to encode (i) the reduced sequence into an encoded reduced sequence, the encoded reduced sequence enabling a low resolution rendering of the original geometrical shape, (ii) a reconstruction information set representing the difference between the reduced sequence and the first data set, the reconstruction information set defining additional information to the reduced sequence, enabling a higher resolution rendering of the original geometrical shape, and (iii) the second data set, such that a combination of the encoded reduced sequence, the encoded reconstruction information set, and the encoded second data set allow for a complete reconstruction of the original sequence, enabling the full resolution rendering of the original geometrical shape.

\* \* \* \* \*